United States Patent Office
3,113,025
Patented Dec. 3, 1963

3,113,025

DIAZOTYPE MATERIALS FOR THE PRODUCTION OF BLACK IMAGES

Edward C. Bialczak, Johnson City, N.Y., assignor to General Aniline & Film Corporation, New York, N.Y., a corporation of Delaware No Drawing. Filed Mar. 2, 1960, Ser. No. 12,285
5 Claims. (Cl. 96—91)

This invention relates to diazotype photoprinting materials. More particularly, this invention relates to diazotype photoprinting materials capable of producing black diazotype images and to certain novel azo color coupling compounds which are instrumental in giving rise to the said black diazotype images.

It is known to produce photographic images based upon the light sensitivity of certain aromatic diazo compounds. In such a system, the images are composed of dyes and are formed by reacting the aromatic diazo compound which has previously been exposed to a light pattern with a coupling component. It is likewise known that aromatic diazos can couple either before exposure or afterwards. In the commonly practiced system, diazos are selected which are destroyed in the exposed portions. As a consequence, the image so obtained is the result of coupling between the unexposed and, therefore, undestroyed diazo and the coupling component.

In the utilization of light sensitive diazo materials for the production of photographic images, the so called two-component system has found commercial acceptance. In this arrangement, a support or base such as paper, film, plastic materials, textiles, metals, ceramics such as glass or the like is coated with an azo coupling component and a light sensitive diazo compound which is destroyed or otherwise modified by exposure to light so as to render it incapable of reacting with the diazo coupling component to form a coloration. Such sensitizing components are stabilized against coupling prior to exposure. After the light sensitive layer is exposed to light of varying intensity as modulated by an original design or pattern or optical image, development is effected by causing the residual diazo compound to couple with the coupling component usually by treatment with an alkaline substance. Advantageously, development can be brought about by exposure to an alkaline gas such as ammonia or the vapor of a volatile nitrogenous base. Other alkaline materials for this purpose include aqueous solutions of ammonia, triethanolamine, sodium carbonate, sodium triphosphate and the like.

If desired, the azo coupling component may be incorporated in the alkaline developing bath, commonly referred to as the one-component process. In this system, the light sensitive diazotype material is exposed and development effected by contacting the exposed diazo material in the alkaline bath containing the azo coupling component.

In photographic processes based on light sensitive diazotype materials, the images so obtained are composed of organic dyes and, as a consequence, are colored. Depending on the particular structure of the dye, images can be derived in a wide variety of colors such as blue, red, sepia and the like. However, it is often desirable to obtain diazotype images rendered in neutral tones, i.e., black and white images. The production of such neutral diazotype materials is a difficult matter since there are no known satisfactory single coupling components capable of reacting with a light sensitive diazonium compound to yield black images.

In one method for the production of black and white diazotype images, it is proposed to use a combination of different coupling components. This method requires the simultaneous formation, during development, of mixed dye images, the overall absorption of which spans the visible spectrum. As a consequence, the images thus obtained are essentially a neutral black. For instance, if one of the couplers or coupling components yields a yellow dye and the other a blue dye, these colors blend together with concomitant production of a black image.

The above described method for the production of the neutral diazotype images, while feasible from a theoretical standpoint, is difficult to put into practice. It is, for instance, absolutely essential that the mixture of coupling components reacts at comparable rates. If this condition is not met, the so obtained image, rather than a neutral black, will be tinged with color due to an excess of one of the dyes because of uneven coupling speeds. It is, furthermore, necessary that the different couplers react or couple at comparable speeds over a practical range of exposures, that is, the exposure latitude must be within practical limits. In addition, couplers used for the production of black diazotype images must possess certain other important properties. For example, they cannot discolor during storage especially from premature coupling or darkening of the sensitizing components. The dyes formed from the coupling components must have sufficient light stability and be immune to the effects of the atmosphere. The coupling components must also possess sufficient solubility in the coating solvents to permit their application to a base.

It is, therefore, the aim and purpose of this invention to provide superior black and white diazotype images by means of diazo photoprinting materials embodying the improvements and advantages set forth above. Moreover, it is an object to provide azo coupling components which are capable of reacting with a diazotized p-phenylenediamine to yield a mixture of dyes and in such proportions as to produce an essentially neutral image or color.

Other objects will become apparent as the description proceeds.

In accordance with the invention, I provide neutral or black and white diazotype photographic images by causing to form simultaneously and in juxtaposition a yellow image and a greenish-blue image. On viewing by white light, the greenish-blue image combined with the yellow image absorbs essentially all of the incident radiation. The overall effect is the rendition of a black or neutral diazotype image over a wide range of exposures.

My invention is predicated on the discovery of a new naphthanilide azo coupling component which, when employed in combination with a m,m'-dioxydiphenol and the mixture coupled with a p-phenylenediamine light sensitive diazonium compound, gives rise to excellent neutral diazo photographic images.

The naphthanilide azo coupling components as described herein are, themselves, new entities and can be represented by the following general formula:

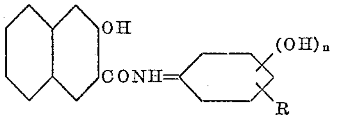

wherein R is hydrogen or alkyl and $n$ is an integer of from 1 to 2.

Examples of couplers falling within the ambit of the aforesaid formula include the following:

(1)

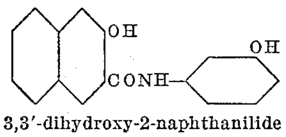

3,3'-dihydroxy-2-naphthanilide (2)
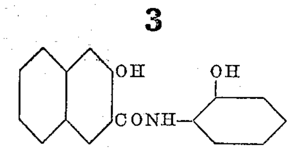
3,2'-dihydroxy-2-naphthanilide (3)
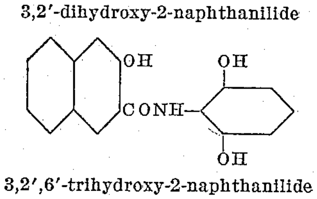
3,2',6'-trihydroxy-2-naphthanilide (4)
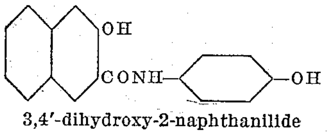
3,4'-dihydroxy-2-naphthanilide (5)
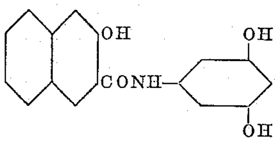
3,3',5'-trihydroxy-2-naphthanilide (6)
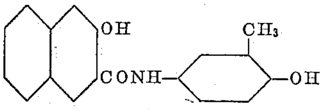
3,4'-dihydroxy-3'-methyl-2-naphthanilide (7)
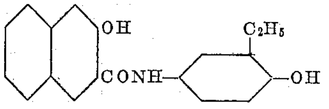
3'-ethyl-3,4'-dihydroxy-2-naphthanilide (8)
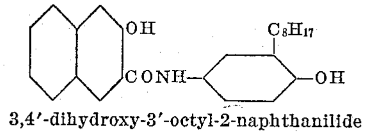
3,4'-dihydroxy-3'-octyl-2-naphthanilide (9)
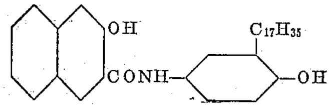
3'-heptadecyl-3,4'-dihydroxy-2-naphthanilide The m,m'-dioxydiphenol couplers which are used herein as the source of the yellow images are described in U.S. Patent No. 2,940,852, issued June 14, 1960, to Clifford E. Herrick, Jr. and Chester E. Slimowicz.

Exemplary m,m'-dioxydiphenols are depicted formulistically below:

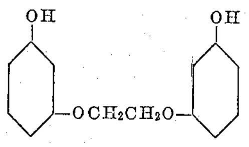

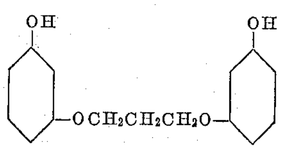

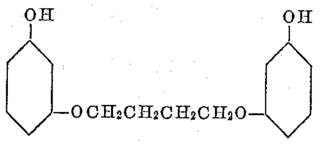

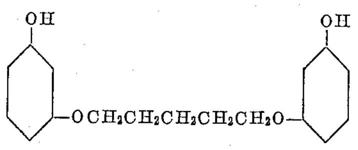

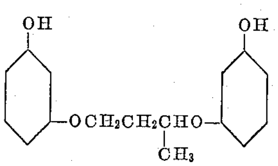

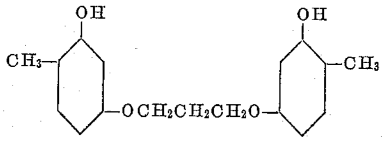

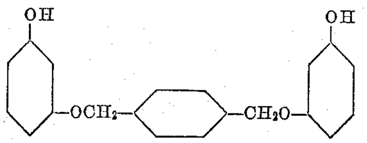

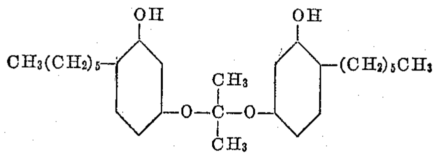

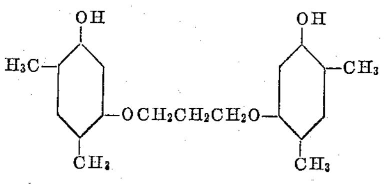

The light sensitive diazo compounds as used herein are derived from p-phenylenediamine, examples of which are:

N-diethyl-p-phenylenediamine
N-dimethyl-p-phenylenediamine
N-dipropyl-p-phenylenediamine
p-Morpholinobenzenediazonium chloride
2,5-diethoxy-p-morpholinobenzenediazonium chloride
2,5-dimethoxy-p-morpholinobenzenediazonium chloride
2,5-dibutoxy-p-morpholinobenzenediazonium chloride
2,5-diethoxy-p-piperidinobenzenediazonium chloride
2,5-dimethoxy-p-piperidinobenzenediazonium chloride
2,5-dibutoxy-p-piperidinobenzenediazonium chloride and the like.

I have found that particularly excellent neutral diazo images can be obtained wherein a combination of p-phenylenediaminediazonium salts are employed. Especially applicable for the aforesaid purpose are mixtures of p-dialkylaminobenzenediazonium salts and 2,5-dialkoxyl-p-morpholinobenzeneazonium salts. The visual density and opacity of neutral diazotype images produced by the aforesaid combination of light sensitive diazo compounds is of a high order.

As examples or supports for the light sensitive type printing materials which I have found suitable for practicing the invention include paper, a cellulose or cellulose ester film, polystyrene film, polyester film, plastic impregnated or coated cloth, glass cloth, glass plate and the like.

It is to be understood that, if desired, auxiliary materials may be added or otherwise incorporated in the light sensitive composition as described herein, which materials may function as stabilizers, preservatives, extenders, color intensifiers and light sensitive intensifiers.

The neutral or black and white diazotype images produced in accordance with the method described herein retain their neutral tones over a wide range of exposure. In this respect, the aforementioned neutral images are superior to those of the prior art wherein a yellow image is combined with a blue image derived from Naphthol AS couplers which are hydroxy 2-naphthol o-anisidides.

Thus, coatings were prepared containing a mixture of a Naphthol AS coupler, a yellow image-forming coupler and a light sensitive diazonium salt derived from p-phenylenediamine. Whereas such light sensitive diazo elements yielded relatively neutral black images in the areas of high exposure, the tonal gradation was poor. This was manifested by reddish tinged images in the areas of low exposure. The lack of tonal response over a wide exposure latitude constitutes a decided disadvantage of light sensitive diazo elements containing Naphthol AS couplers. Since it is obvious that light sensitive materials must respond uniformly to a wide variety of exposure ranges, it is believed to be manifest that the light sensitive diazo photographic elements, as described herein, represent a decided advantage and forward step in the art.

The following examples illustrate methods of carrying out the present invention but it is to be understood that these examples are given by way of illustration and not of limitation.

*Example 1*

A composition having the following components was prepared:

| | | |
|---|---|---|
| 2-methyloxyethanol | cc | 90.0 |
| Cellulose acetatebutyrate | g | 2.0 |
| Sulfosalicylic acid | g | 1.5 |
| 2,5-diethoxy-p-morpholinobenzenediazonium zincichloride | g | 0.4 |
| Zinc chloride | g | 0.2 |
| 3,3′-dihydroxy-2-naphthanilide | g | 0.4 |
| m,m′-(Ethylenedioxy) diphenol | g | 2.0 |
| 4-chlororesorcinol | g | 0.25 |

This solution was coated on a clear cellulose triacetate base. The dried sensitized film was then exposed to a mercury vapor lamp of the type employed in a white print machine. The original in this case was a photographic silver positive. Development was accomplished by passing the exposed sheet of film through the ammonia chamber of the white print machine. The so obtained print was characterized by an image having a neutral black of high opacity.

A coating composition was prepared identical to the above-described formulation except that the 3,3′-dihydroxy-2-naphthanilide was substituted with one of the known Naphthol AS couplers such as 3-hydroxy-2-naphth-o-anisidide at a concentration of .4%. The resulting image was a black with objectionable reddish halftones.

*Example 2*

A composition having the following components was prepared:

| | | |
|---|---|---|
| 2-methoxyethanol | cc | 97.0 |
| Sulfosalicylic acid | g | 0.5 |
| Zinc chloride | g | 0.1 |
| 3,3′-dihydroxy-2-naphthanilide | g | 0.4 |
| m,m′-(Ethylenedioxy) diphenol | g | 1.0 |
| Diethyl terephthaloyldiacetate | g | 0.25 |
| p-Diethylaminobenzenediazonium fluoborate | g | 0.4 |
| 2,5-diethoxy-4-morpholinobenzenediazonium zincichloride | g | 0.4 |
| Cellulose acetatebutyrate | g | 3.0 |

The above formulation was coated on clear polystyrene of the type and grade commonly used as a base for photographic elements. The coating was exposed and developed as described in Example 1. The image on the print was a neutral black shade and of high opacity.

Substituting 3,3′-dihydroxy-2-naphthanilide with one of the known Naphthol AS couplers such as 3-hydroxy-2-naphth-o-anisidide and at a concentration of .4% resulted in very bluish halftones.

*Example 3*

A composition having the following components was prepared:

| | | |
|---|---|---|
| 2-methoxyethanol | cc | 95.0 |
| Sulfosalicylic acid | g | 1.0 |
| Zinc chloride | g | 0.3 |
| m,m′-(Ethylenedioxy) diphenol | g | 1.25 |
| N-1-naphthylacetoacetamide | g | 0.12 |
| 3,3′-dihydroxy-2-naphthanilide | g | 0.46 |
| p-Morpholinobenzenediazonium fluoborate | g | 0.7 |
| Cellulose acetatebutyrate | g | 2.0 |

The solution was coated on a polyester base of the type known under the trademark "Mylar." Before coating, the Mylar filmbase was subbed with the following composition:

| | | |
|---|---|---|
| Copolymer of vinyl acetate-crotonic acid | g | 5.0 |
| Reactive urea-formaldehyde resin | g | 5.0 |
| Finely divided silica | g | 2.0 |
| Sulfosalicylic acid | g | 0.2 |
| Methyl Cellosolve | cc | 50.0 |

The procedure as to processing was the same as outlines in Example 1. With this formulation, color response after development is a neutral black of extremely high opacity.

If, in this formulation, 3,3′-dihydroxy-2-naphthanilide was substituted with a known Naphthol AS coupler such as 3-hydroxy-2-naphth-o-toluidide at a concentration of 0.46%, the resultant print would have very bluish halftones.

Another disadvantage is using known Naphthol AS couplers such as 3-hydroxy-2-naphth-o-anisidide or 3-hydroxy-2-naphth-o-toluidide at a concentration of 0.46% in this formulation as a color shift to the brown as the sensitized material undergoes natural package aging.

*Example 4*

A composition having the following components was prepared:

| | | |
|---|---|---|
| Acetone | cc | 30.0 |
| Methyl alcohol | cc | 50.0 |
| 2-methoxyethanol | cc | 20.0 |
| Sulfosalicylic acid | g | 1.2 |
| Zinc chloride | g | 0.4 |
| m,m′-(Ethylenedioxy) diphenol | g | 2.0 |
| 3,3′-dihydroxy-2-naphthanilide | g | 0.4 |
| 4-chlororesorcinol | g | 0.25 |
| p-Diethylaminobenzenediazonium fluoborate | g | 0.75 |
| 2,5-diethoxy-p-morpholinobenzenediazonium zincichloride | g | 0.75 |

This formulation was coated on a plastic coated cloth. The procedure as to processing was carried out as described in Example 1. After development there was obtained a neutral black image with opacity suitable for an intermediate black.

Replacing 3,3′-dihydroxy-2-naphthanilide with known Naphthol AS couplers wherein the anilide ring contains a methyl or methoxy radical such as 3-hydroxy-2-naphth-o-anisidide or 3-hydroxy-2-naphth-o-toluidide at concentrations of 0.4% gave rise to blacks with reddish halftones.

*Example 5*

A composition having the following components was prepared:

| | | |
|---|---|---|
| 2-methoxyethanol | cc | 50.0 |
| Acetone | cc | 30.0 |
| Formic acid | cc | 10.0 |
| Sulfosalicylic acid | g | 2.4 |
| Zinc chloride | g | 0.8 |
| m,m'-(Ethylenedioxy) diphenol | g | 0.8 |
| N-1-naphthylacetoacetamide | g | 0.2 |
| 3,3'-dihydroxy-2-naphthanilide | g | 0.1 |
| p-Morpholinobenzenediazonium chloride zincichloride | g | 3.0 |

The above formulation was applied to a glass cloth base which had been previously subbed in the following manner:

To 95 parts of water were added 5 parts by volume of 28° Bé. aqueous ammonia. To this solution were added 7 parts of the copolymer of vinyl acetate-crotonic acid with agitation and this mixture stirred until solution was complete. Seven parts by weight of a finely divided, non-colloidal silica, as previously described, were then added and the slurry agitated until a uniform dispersion was obtained. This precoat solution was then applied to the glass cloth base and the excess doctored off with a glass doctor bar.

Processing procedures were the same as specified in Example 1.

Sensitizing this precoated material with the above formulation results results in a neutral black shade of high opacity when developed through an ammonia chamber of a white print machine.

As stated in previous examples, a substitution of 3,3'-dihydroxy-2-naphthanilide with a known Naphthol AS type coupler such as 3-hydroxy-2-naphth-o-anisidide at a concentration of .1% shifted the color to a reddish and undesirable black.

*Example 6*

The procedure followed in this example paralleled that given in Example 1 excepting that the naphthanilide used was 3,2'-dihydroxy-2-naphthanilide. The processing and results obtained coincided with the first example.

*Example 7*

In this instance, 3,2',6'-trihydroxy-2-naphthanilide was used in place of the 3,3'-dihydroxy derivative of Example 1. The process and results obtained thereby were substantially the same as those of the earlier example.

*Example 8*

In this example, the sensitizing formulation contained, as the naphthanilide coupling component, 3,4'-dihydroxy-2-naphthanilide. After processing according to the first example, prints were obtained characterized by neutral black images of high opacity.

*Example 9*

The composition as used herein was identical to that of the first example except that the naphthanilide was 3,4'-dihydroxy-3'-methyl-2-naphthanilide. The results closely paralleled those of Example 1.

I claim:

1. A diazotype photoprinting material having a light sensitive layer comprising a light sensitive diazotized p-phenylenediamine, a m,m'-dioxydiphenol coupling component having the formula:

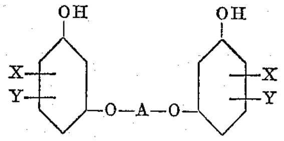

wherein X and Y are selected from the class consisting of hydrogen and alkyl groups and A is selected from the class consisting of alkylene groups of 2–6 carbon atoms and a p-phenylene-bis-methylene group, and an azo coupling component of the following formula:

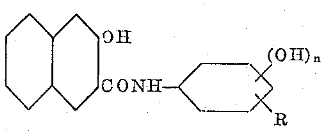

wherein R is selected from the class consisting of alkyl of from 1 to 8 carbon atoms and hydrogen and $n$ is an integer of from 1 to 2, in an amount less than that of said m,m'-dioxydiphenol coupling component, but not substantially less than 1/5 of the amount of the latter.

2. A diazotype photoprinting material having a light sensitive layer comprising a light sensitive mono-diazotized p-phenylenediamine in which the remaining amino group is a tertiary amino group, a m,m'-dioxydiphenol coupling component having the formula:

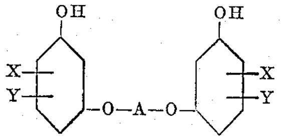

wherein X and Y are selected from the class consisting of hydrogen and alkyl groups and A is selected from the class consisting of alkylene groups of 2 to 6 carbon atoms and a p-phenylene-bis-methylene group, and an azo coupling component of the following formula:

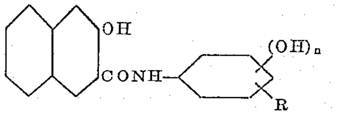

wherein R is selected from the class consisting of alkyl of from 1 to 8 carbon atoms and hydrogen and $n$ is an integer of from 1 to 2, in an amount less than that of said m,m'-dioxydiphenol coupling component, but not substantially less than 1/5 of the amount of the latter.

3. A diazotype photoprinting material having a light sensitive layer comprising a light sensitive mono-diazotized 2,5-dialkoxy-p-phenylenediamine in which the remaining amino group is a tertiary amino group, a m,m'-dioxydiphenol coupling component having the formula:

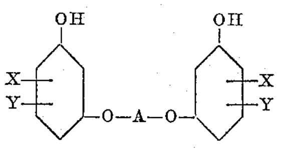

wherein X and Y are selected from the class consisting of hydrogen and alkyl groups and A is selected from the class consisting of alkylene groups of 2–6 carbon atoms and a p-phenylene-bis-methylene group, and an azo coupling component of the following formula:

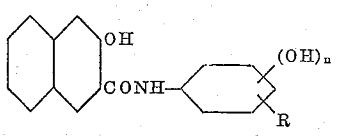

wherein R is selected from the class consisting of alkyl of from 1 to 8 carbon atoms and hydrogen and $n$ is an integer of from 1 to 2, in an amount less than that of said m,m'-dioxydiphenol coupling component, but not substantially less than 1/5 of the amount of the latter.

4. A diazotype photoprinting material having a light sensitive layer comprising a light-sensitive mono-diazotized 2,5-dialkoxy-p-phenylenediamine in which the remaining amino group is a tertiary amino group, a m,m'-dioxydiphenol coupling component having the formula:

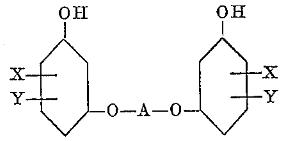

wherein X and Y are selected from the class consisting of hydrogen and alkyl groups and A is selected from the class consisting of alkylene groups of 2 to 6 carbon atoms and a p-phenylene-bis-methylene group, and an azo coupling component of the following formula:

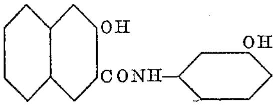

in an amount less than that of said m,m'-dioxydiphenol coupling component, but not substantially less than ⅕ of the amount of the latter.

5. A diazotype photoprinting material having a light sensitive layer comprising a stabilized 2,5-dialkoxy-p-morpholino-benzenediazonium salt, a m,m'-dioxydiphenol coupling component having the formula:

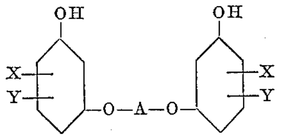

wherein X and Y are selected from the class consisting of hydrogen and alkyl groups and A is selected from the class consisting of alkylene groups of 2 to 6 carbon atoms and a p-phenylene-bis-methylene group, and an azo coupling component of the following formula:

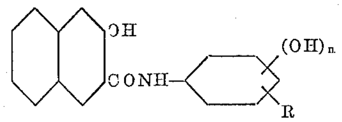

wherein R is selected from the class consisting of alkyl of from 1 to 8 carbon atoms and hydrogen and $n$ is an integer of from 1 to 2, in an amount less than that of said m,m'-dioxydiphenol coupling component, but not substantially less than ⅕ of the amount of the latter.

References Cited in the file of this patent

UNITED STATES PATENTS

| | | |
|---|---|---|
| 2,022,579 | Turski | Nov. 26, 1935 |
| 2,405,523 | Sease et al. | Aug. 6, 1946 |
| 2,410,397 | Weiss et al. | Oct. 29, 1946 |
| 2,542,715 | Slifkin | Feb. 20, 1951 |
| 2,940,852 | Herrick et al. | June 14, 1960 |
| 3,028,240 | Werner et al. | Apr. 3, 1962 |
| 3,064,049 | Cox | Nov. 13, 1962 |

FOREIGN PATENTS

| | | |
|---|---|---|
| 636,891 | Great Britain | May 10, 1950 |
| 650,046 | Great Britain | Feb. 14, 1951 |